(12) United States Patent
Choi et al.

(10) Patent No.: US 8,176,742 B2
(45) Date of Patent: May 15, 2012

(54) METHOD FOR CONTROLLING INTAKE OF AIR-CONDITIONER OF VEHICLE

(75) Inventors: Jae Sik Choi, Gyeonggi-do (KR); Hak Kyu Kim, Daejeon-si (KR); Dong Won Lee, Daejeon-si (KR)

(73) Assignees: Hyundai Motor Company, Seoul (KR); Halla Climate Control Corp., Daejeon-Si (KR)

( * ) Notice: Subject to any disclaimer, the term of this patent is extended or adjusted under 35 U.S.C. 154(b) by 611 days.

(21) Appl. No.: 12/446,968

(22) PCT Filed: Oct. 25, 2007

(86) PCT No.: PCT/KR2007/005288
§ 371 (c)(1),
(2), (4) Date: Apr. 23, 2009

(87) PCT Pub. No.: WO2008/051036
PCT Pub. Date: May 2, 2008

(65) Prior Publication Data
US 2010/0018229 A1 Jan. 28, 2010

(30) Foreign Application Priority Data

Oct. 25, 2006 (KR) .................. 10-2006-0103759
Oct. 12, 2007 (KR) .................. 10-2007-0102998

(51) Int. Cl.
F25D 17/08 (2006.01)

(52) U.S. Cl. .......................................... 62/186; 165/202
(58) Field of Classification Search .................. 62/178, 62/180, 186; 165/42, 202, 204
See application file for complete search history.

(56) References Cited

U.S. PATENT DOCUMENTS
4,940,083 A * 7/1990 Takenaka et al. ............... 165/42

FOREIGN PATENT DOCUMENTS
| JP | 2005-22595 A | 1/2005 |
| KR | 2002-0007829 A | 1/2002 |
| KR | 10-2004-0080286 A | 9/2004 |

* cited by examiner

Primary Examiner — Marc Norman
(74) Attorney, Agent, or Firm — Morgan, Lewis & Bockius LLP

(57) ABSTRACT

A method for controlling an intake of an air-conditioner of a vehicle is disclosed. The method includes the a-1) step (S1) at which the main door (220) of the intake (200) opens the outdoor-air inlet port (211) and closes the indoor-air inlet port (212), so that only outdoor air flows into the intake, the b-1) step (S2) of detecting operation of the blower (130), the c-1) step (S3) of determining whether set indoor temperature of the vehicle is predetermined temperature or higher, and the d-1) step (S4) at which the subsidiary door (230) opens the subsidiary indoor-air inlet port (213) so that some indoor air flows into the intake. The method automatically controls the intake of the air-conditioner, thus allowing some indoor air to flow into the intake while outdoor air is flowing into the intake, therefore keeping the indoor temperature of the vehicle pleasant, and enhancing heating efficiency.

7 Claims, 14 Drawing Sheets

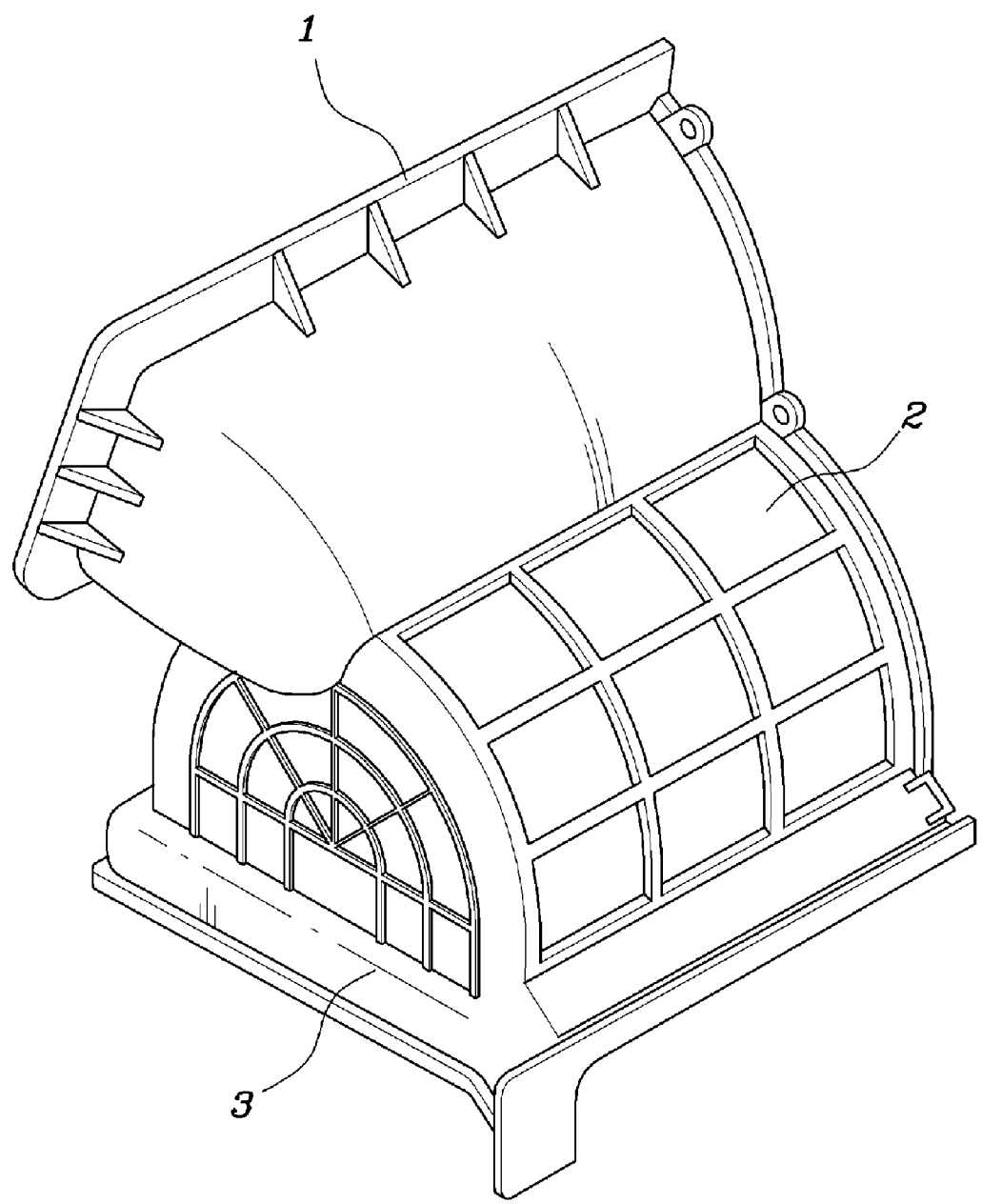
[Fig. 1]

[Fig. 2]
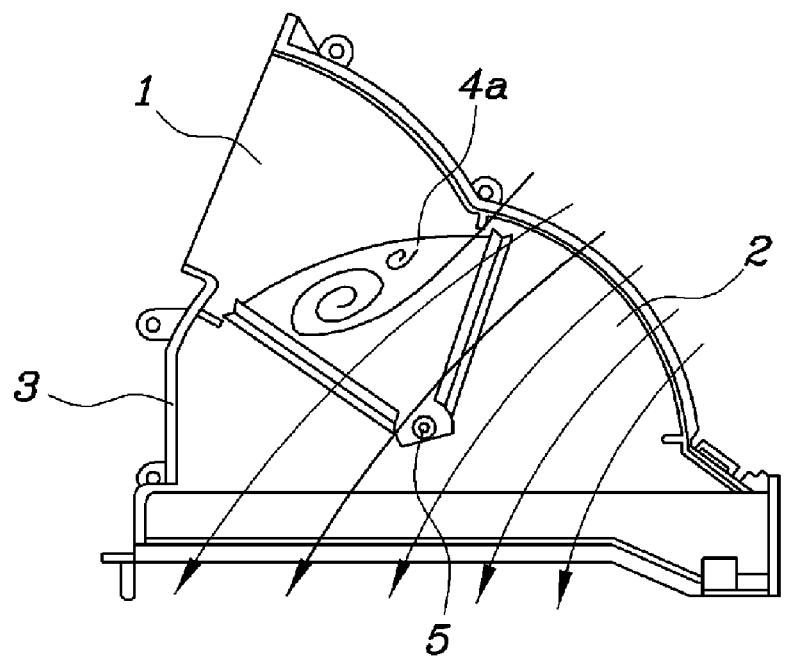
(a)
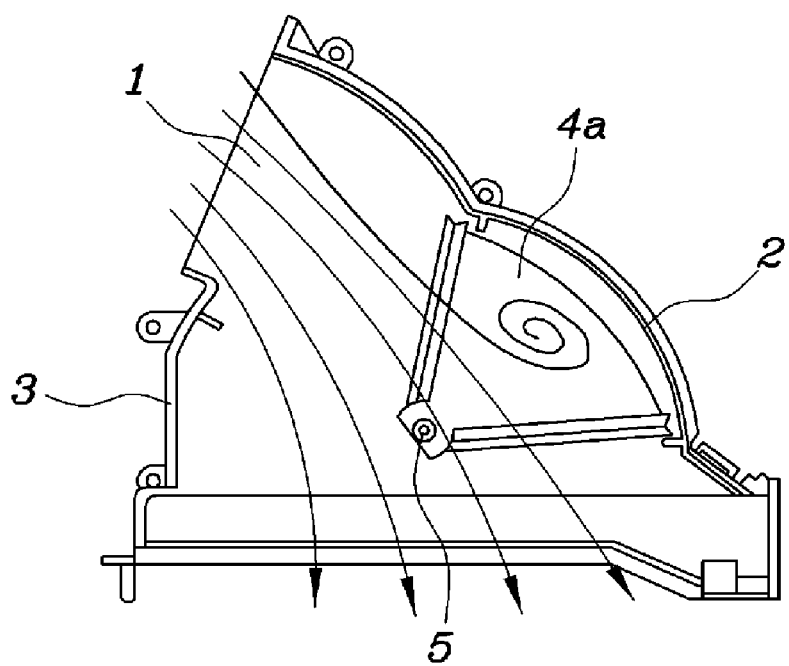
(b)

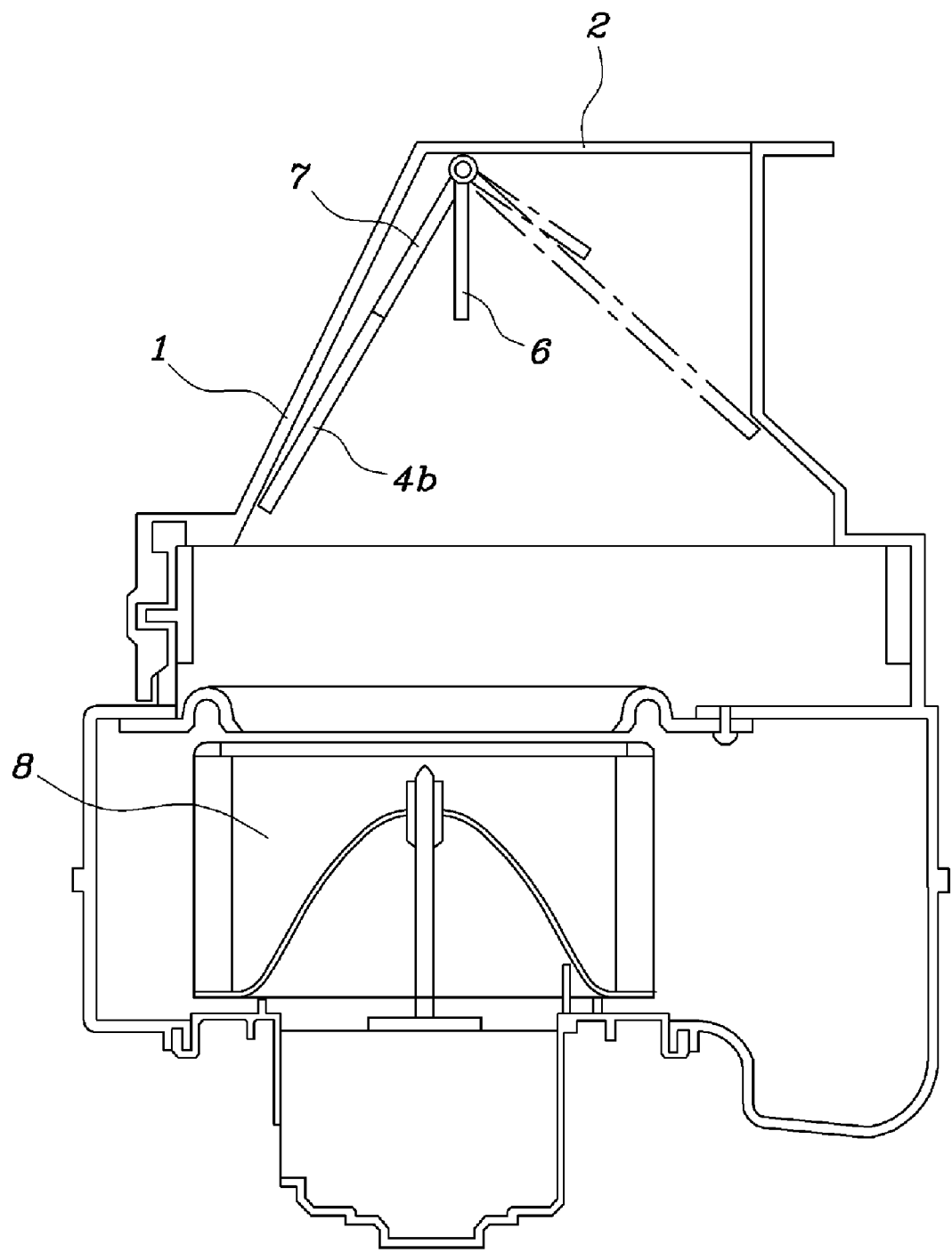
[Fig. 3]

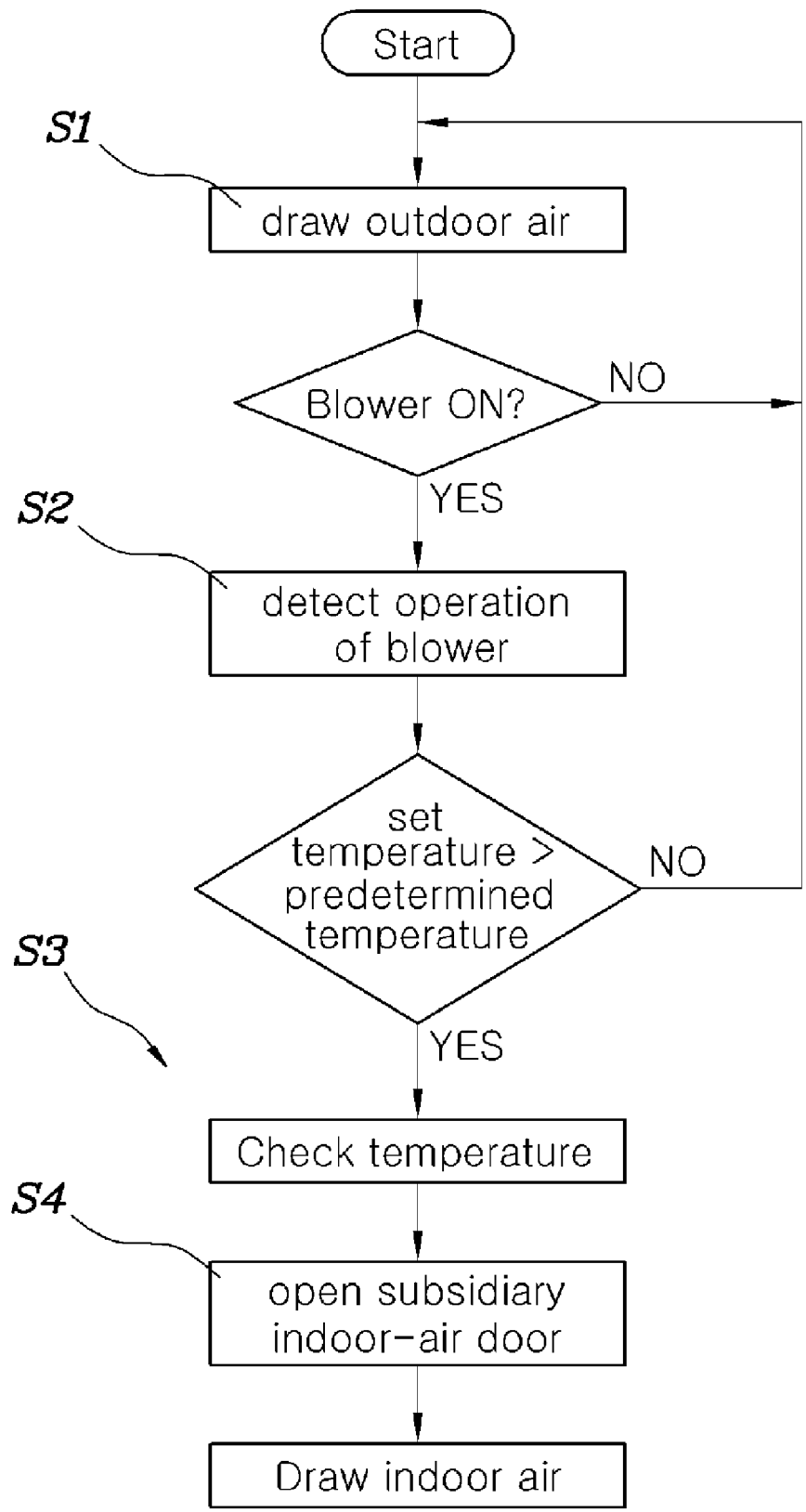
[Fig. 4]

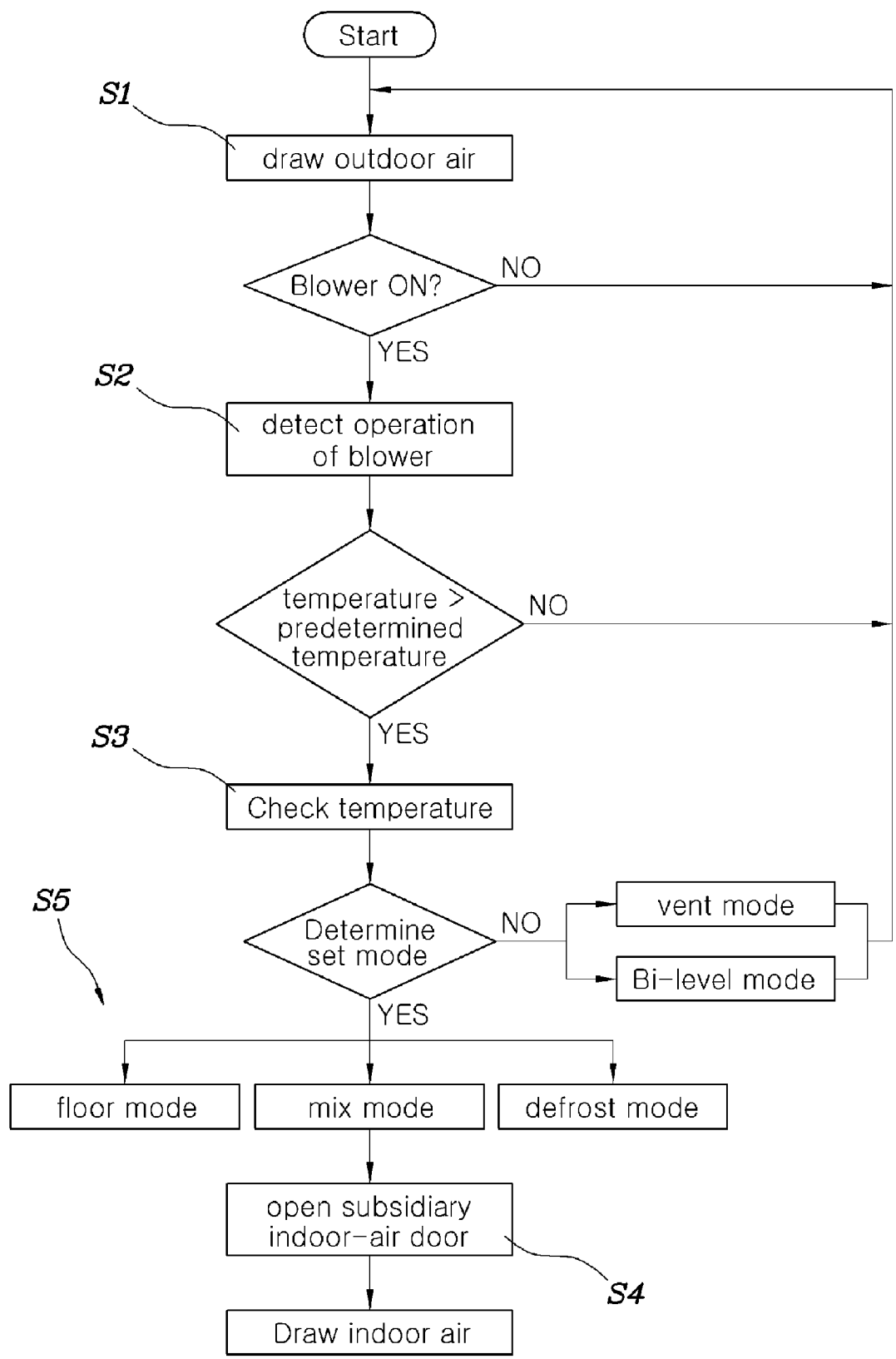
[Fig. 5]

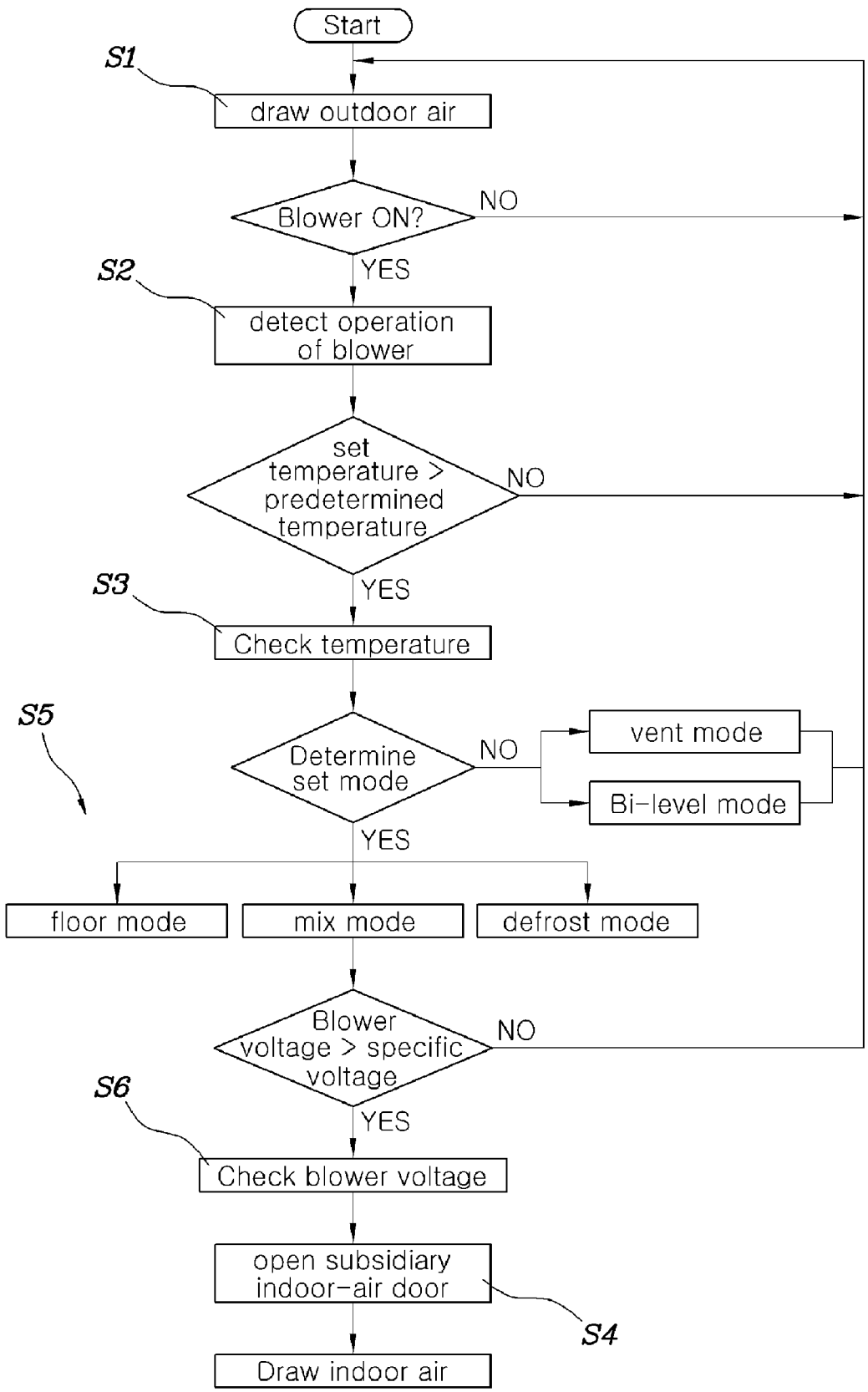
[Fig. 6]

[Fig. 7]
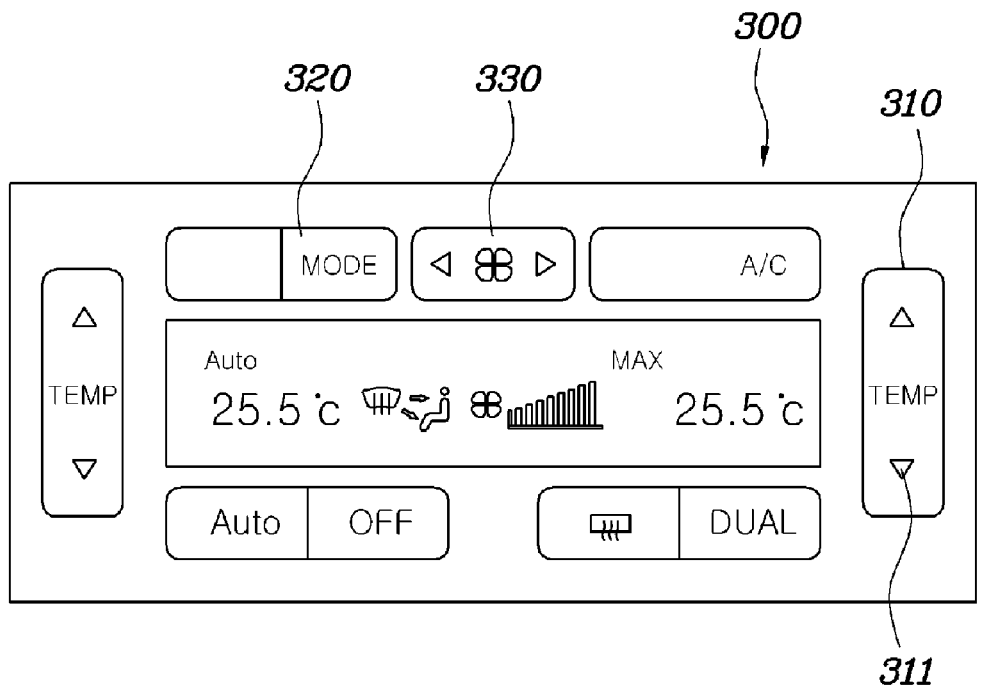
[Fig. 8]
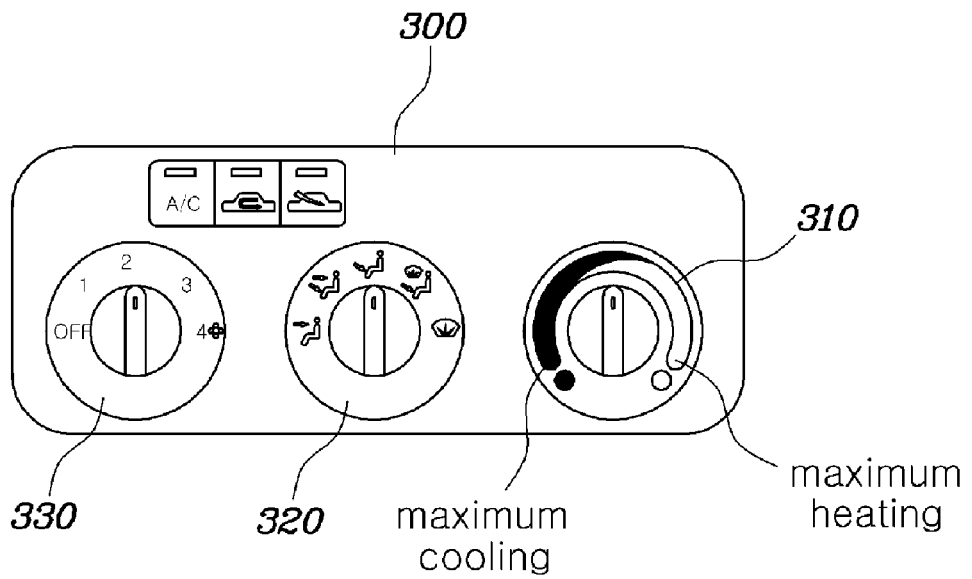

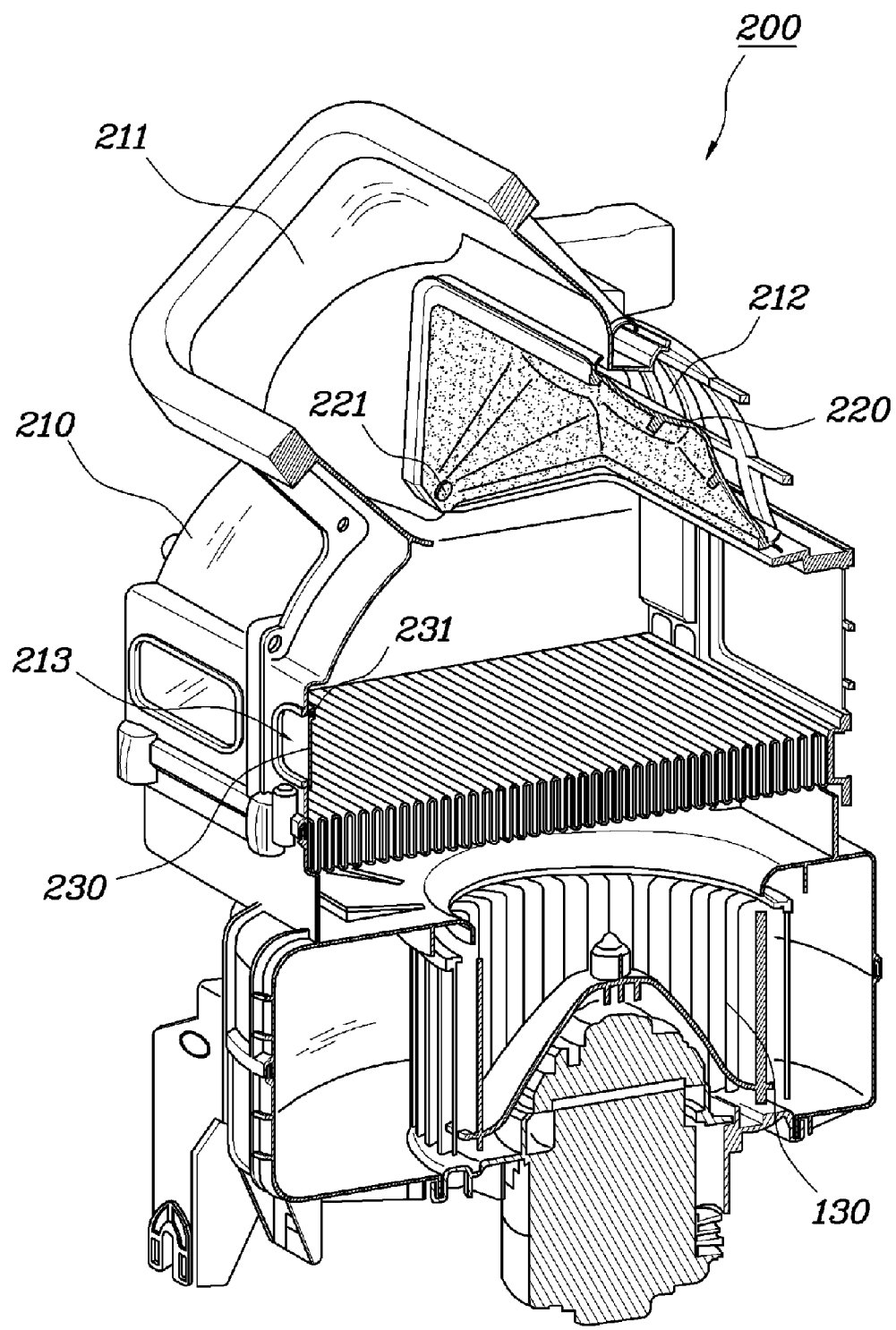
[Fig. 9]

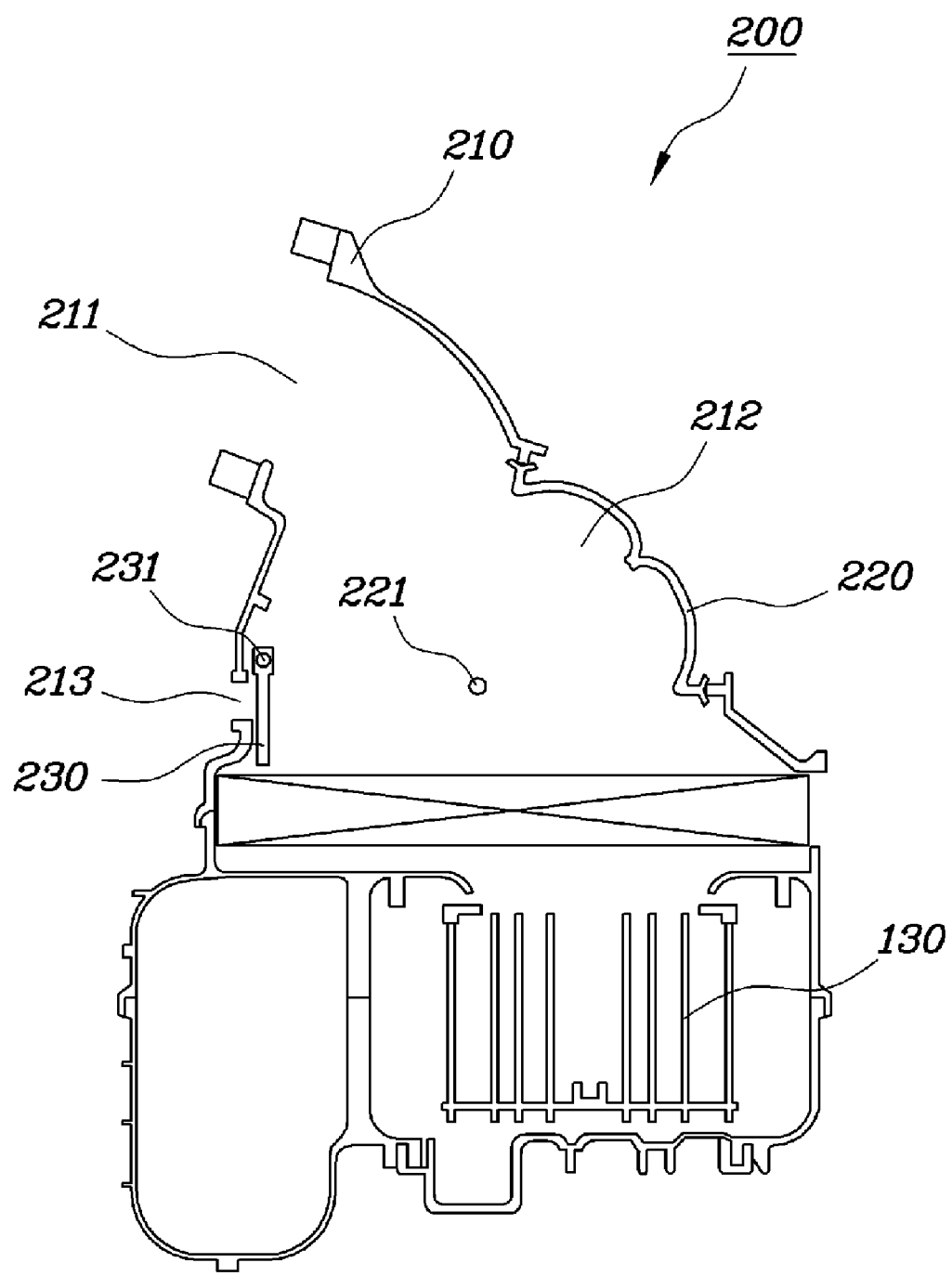
[Fig. 10]

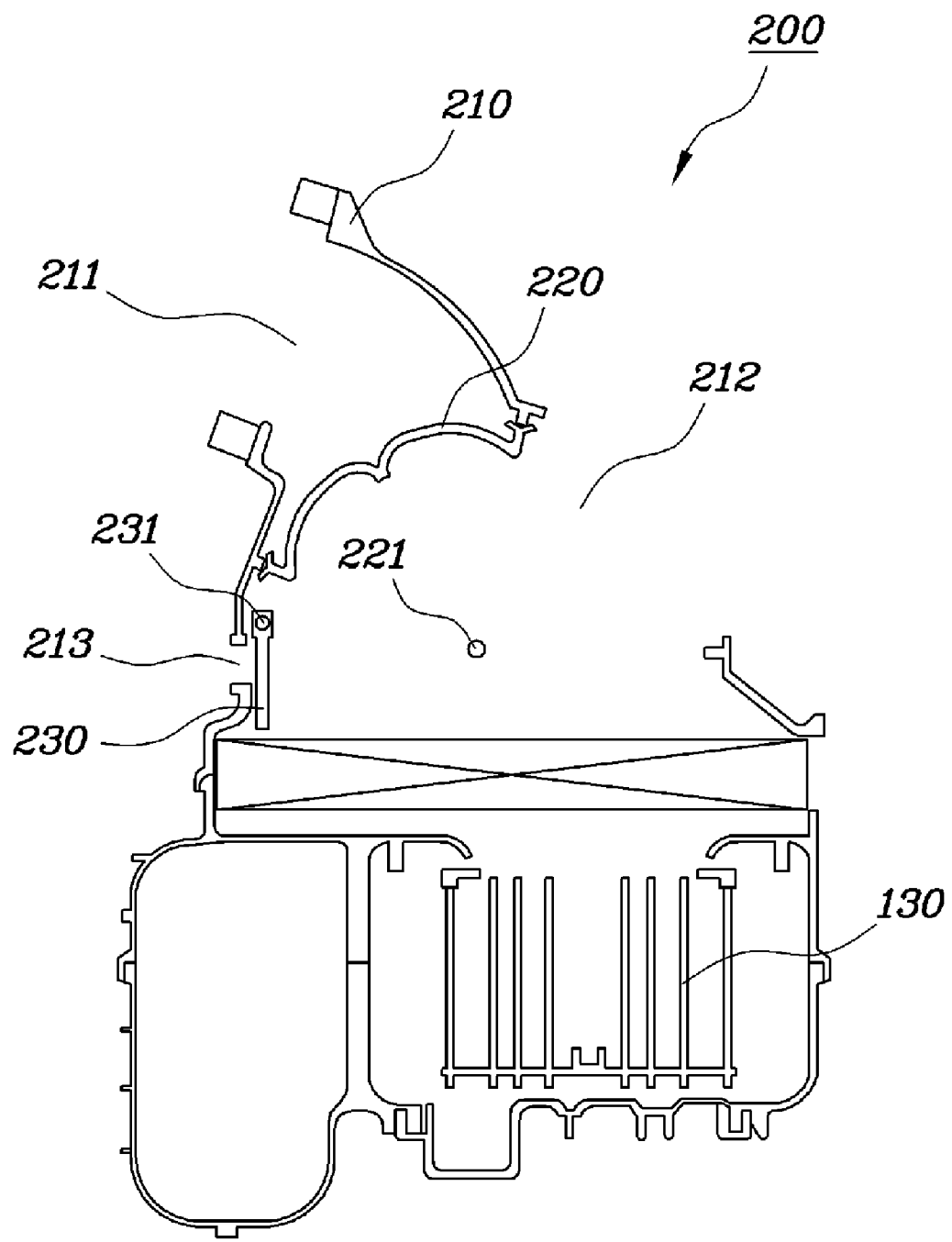
[Fig. 11]

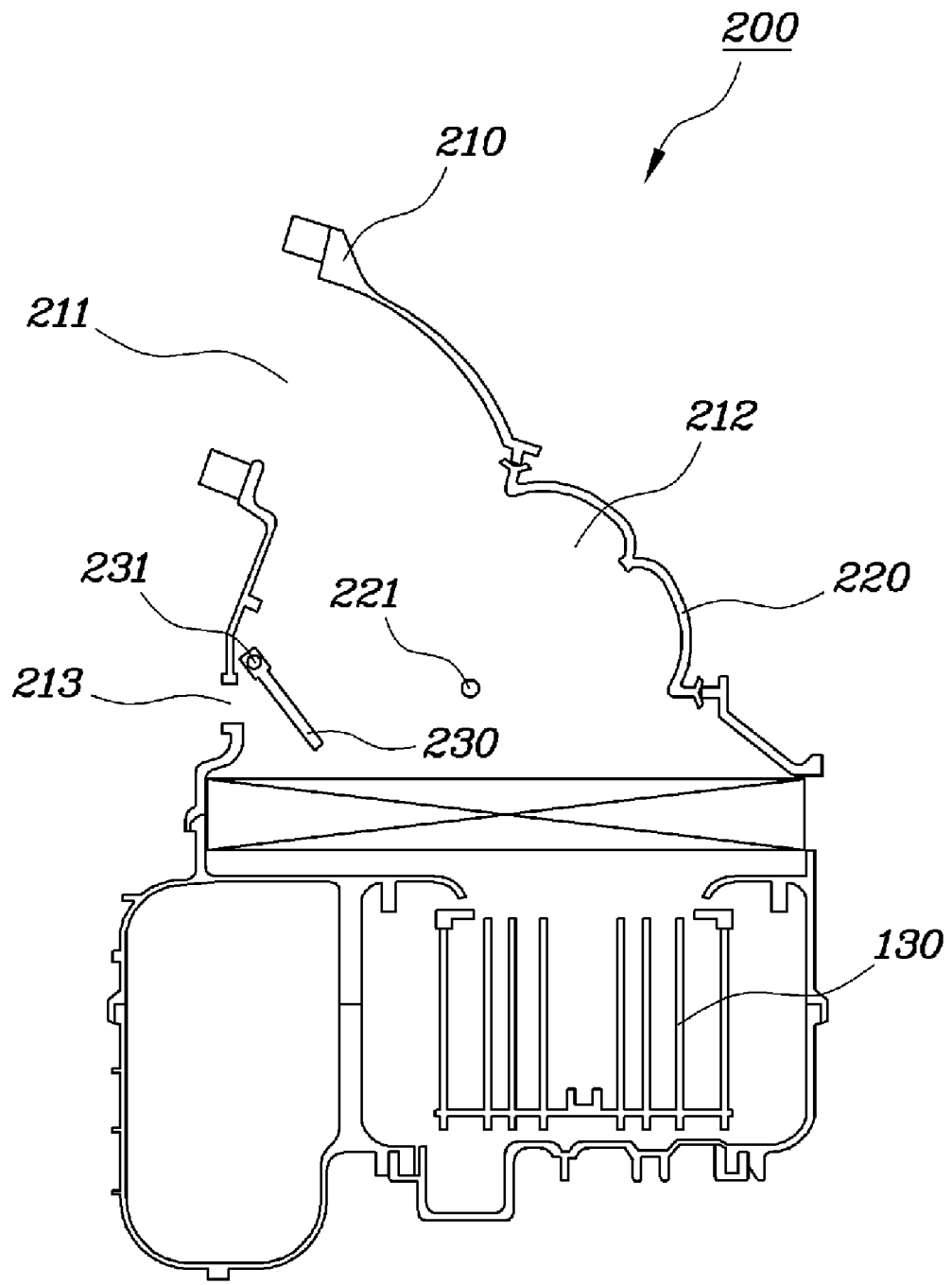
[Fig. 12]

[Fig. 13]
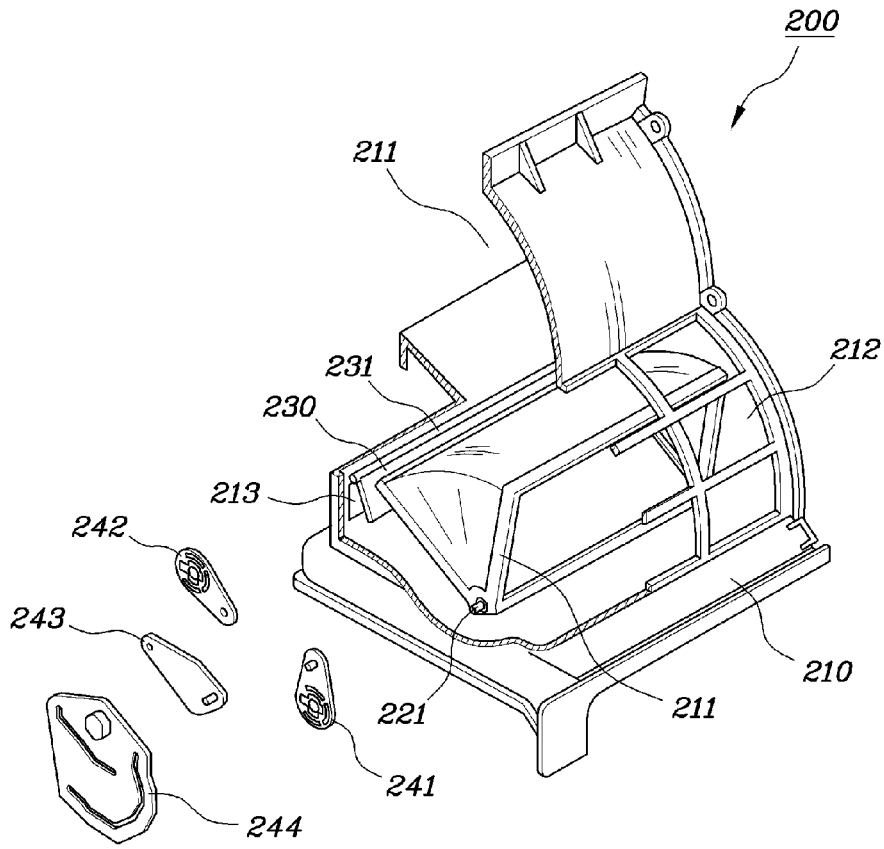
[Fig. 14]
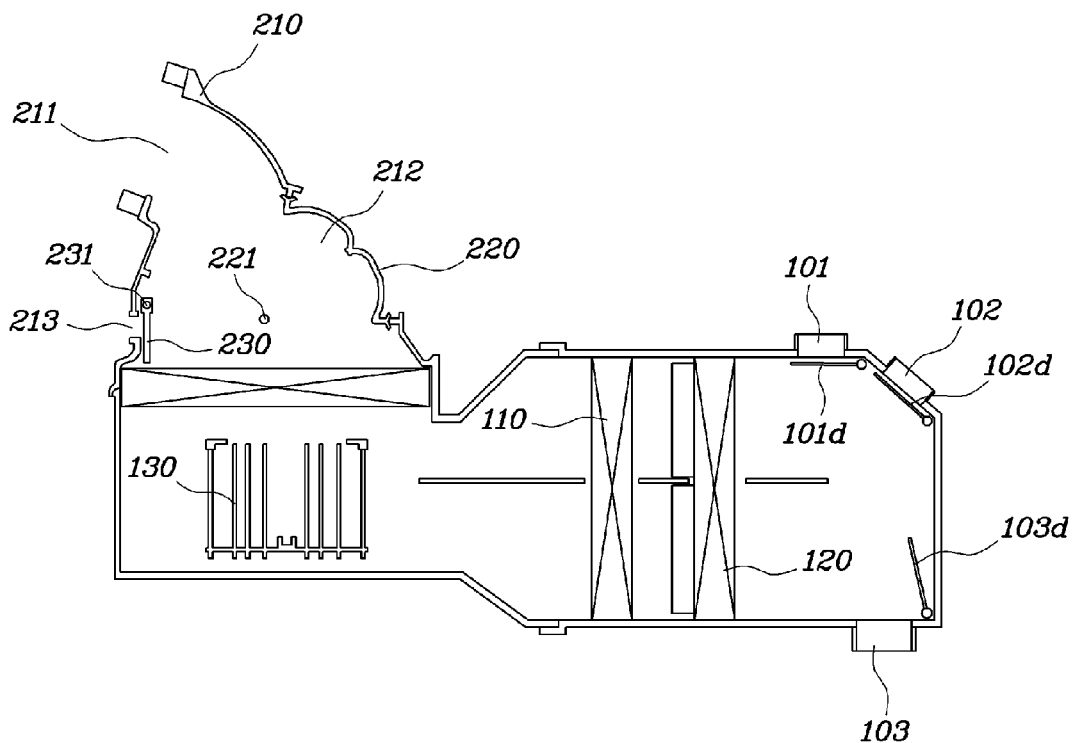

[Fig. 15]
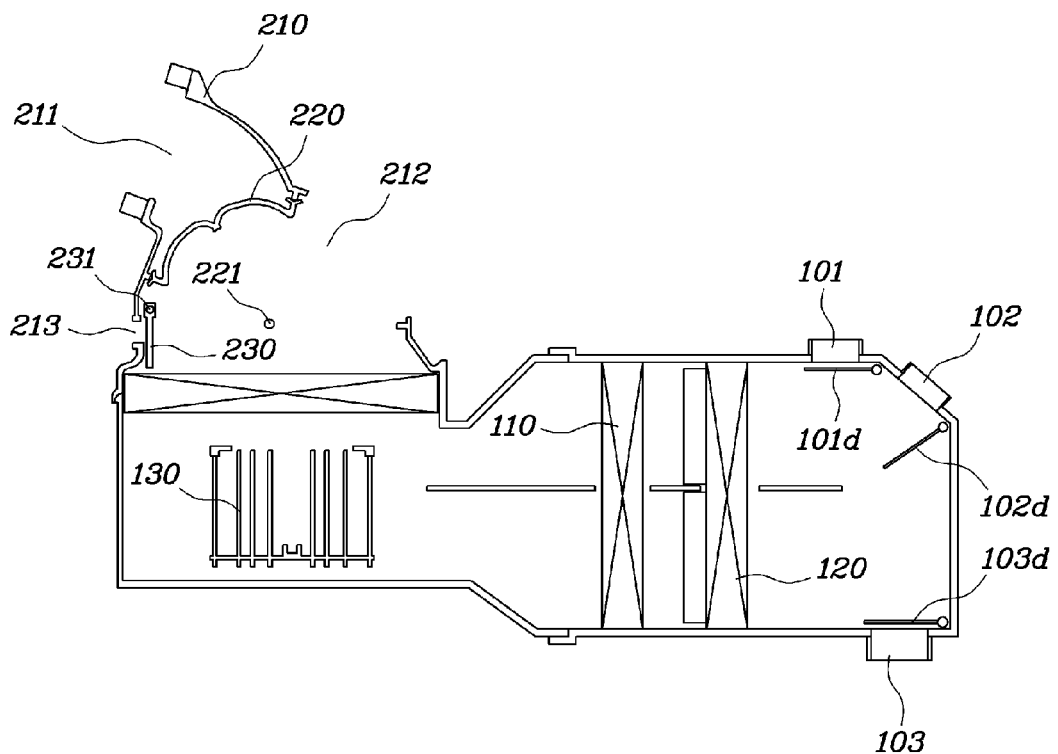
[Fig. 16]
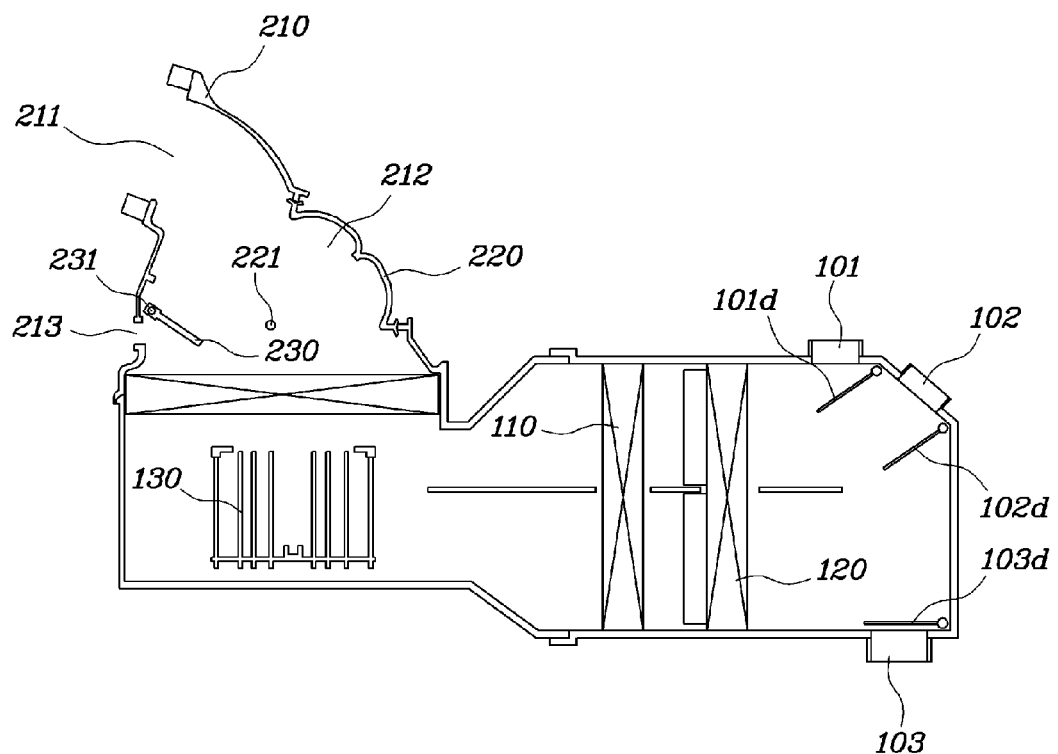

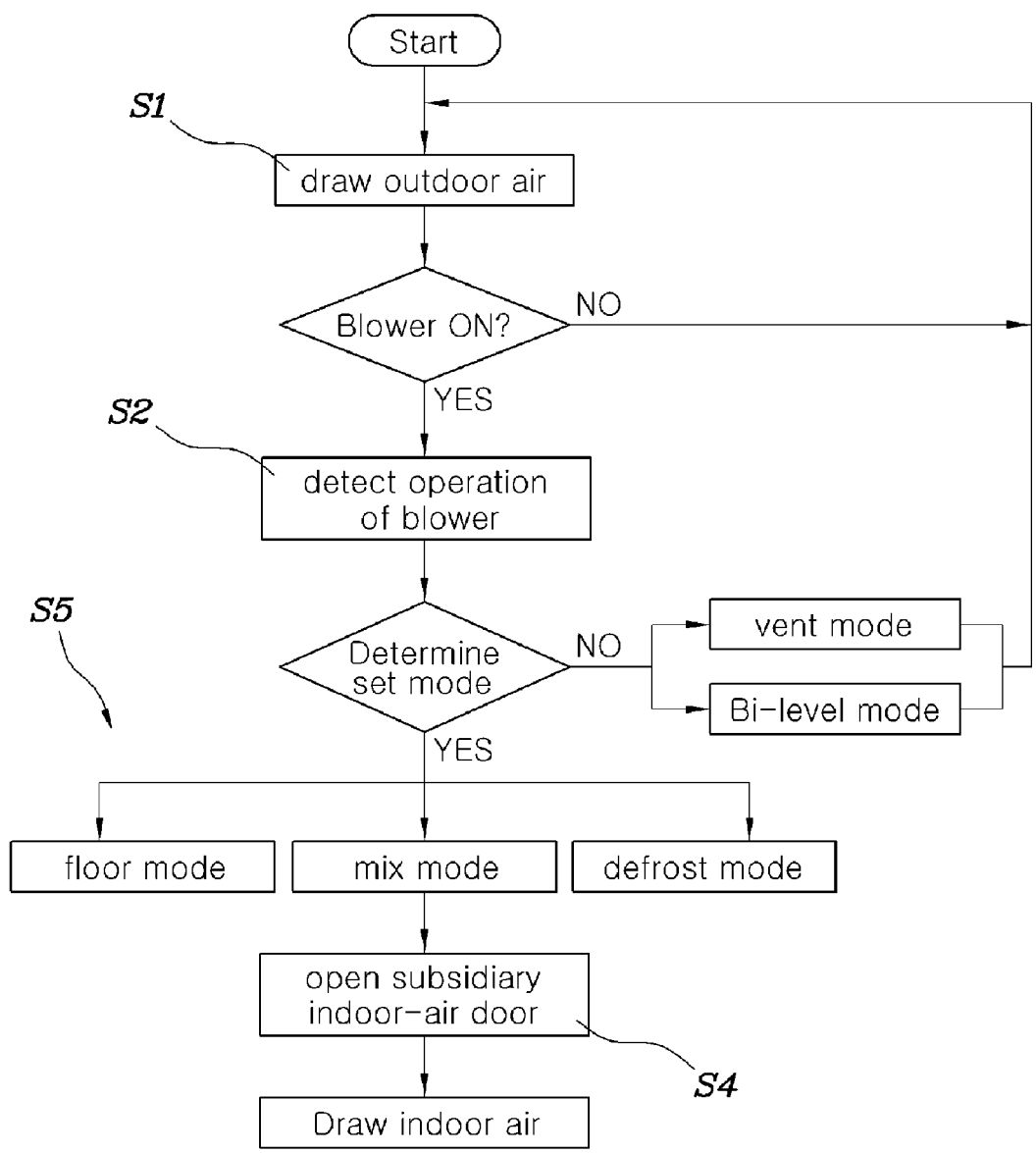

US 8,176,742 B2

METHOD FOR CONTROLLING INTAKE OF AIR-CONDITIONER OF VEHICLE

TECHNICAL FIELD

The present invention relates, in general, to a method for controlling an intake of an air-conditioner of a vehicle and, more particularly, to a method for controlling an intake of an air-conditioner of a vehicle, which allows some indoor air to be introduced into the intake together with outdoor air when a specific condition is satisfied during the inflow of the outdoor air, thus enhancing temperature control efficiency.

BACKGROUND ART

Generally, an air-conditioner for vehicles is an apparatus that draws air from inside and outside a vehicle, cools or heats the drawn air using a heat exchanger, and blows the air, which has undergone the heat exchange process, into the vehicle.

Such an air-conditioner includes an air-conditioner casing, a blower, and an intake. An evaporator and a heater core are provided in the air-conditioner casing, and vents are provided on the outlet side of the air-conditioner casing. The opening ratio of each vent is controlled by a corresponding door. The blower is provided on the inlet side of the air-conditioner casing. The intake is installed to cover the blower.

A driver manipulates a control unit which is provided in a vehicle, so that the air-conditioner of the vehicle may be set to a cooling or heating mode, a vent mode, a bi-level mode, a floor mode, a mix mode, or a defrost mode.

The doors provided on the respective vents are manipulated by a driver, thus opening a specific vent for discharging the air into the vehicle. Further, a temp door is controlled, or the quantity of coolant fed into the heater core is controlled. Thereby, the temperature in the vehicle is regulated.

FIG. 1 is a perspective view showing a conventional intake of an air-conditioner of a vehicle. The conventional intake includes a housing 3 and a main door 4a. An outdoor-air inlet port 1, which communicates with the exterior of the vehicle, and an indoor-air inlet port 2, which communicates with the interior of the vehicle, are provided in the housing 3. The main door 4a rotates about a main-door drive shaft 5 while tracing an arc, thus opening or closing the outdoor-air inlet port 1 or the indoor-air inlet port 2 (see FIG. 2).

FIG. 2 is a schematic view illustrating the operation of the intake of FIG. 1. FIG. 2a shows the state in which the main door 4a closes the outdoor-air inlet port 1 but opens the indoor-air inlet port 2, so that indoor air flows through the indoor-air inlet port 2. FIG. 2b shows the state in which the main door 4a opens the outdoor-air inlet port 1 but closes the indoor-air inlet port 2, so that only outdoor air flows into the intake through the outdoor-air inlet port 1.

That is, the intake of the air-conditioner constructed as described above draws only outdoor air when an outdoor-air mode is selected by a driver. Conversely, when an indoor-air mode is selected, only indoor air is drawn into the intake.

However, such an air-conditioner is problematic in that, if the outdoor-air mode is selected in winter, only outdoor air is fed into a vehicle through the outdoor-air inlet port 1 during the operation of the air-conditioner, so that the performance of the air-conditioner is deteriorated. Further, when only indoor air circulates through the indoor-air inlet port, the interior of the vehicle becomes foul, thus harming a passenger's health.

In order to solve the problem, an intake, which draws a small quantity of indoor air even in the outdoor-air mode in order to enhance heating efficiency, has been proposed. This intake is shown in FIG. 3.

As shown in FIG. 3, the intake is provided with a flat-plate-type main door 4b between an outdoor-air inlet port 1 and an indoor-air inlet port 2. The main door 4b is connected to an actuator (not shown) via a drive shaft 5. Thus, as the main door 4b rotates about the drive shaft 5, the outdoor-air inlet port 1 or the indoor-air inlet port 2 is opened or closed. A subsidiary indoor-air inlet port 7 is formed in the upper portion of the main door 4b. A subsidiary door 6 is provided on the subsidiary indoor-air inlet port 7, and is rotated to open or close the subsidiary indoor-air inlet port 7.

When the main door 4b opens the indoor-air inlet port 2 and closes the outdoor-air inlet port 1, the subsidiary indoor-air inlet port 7 is closed by the subsidiary door 6 due to its own weight. Thus, in the indoor-air mode, outdoor air is not drawn into the intake, instead, only indoor air is drawn into the intake.

Meanwhile, in the outdoor-air mode, the main door 4b opens the outdoor-air inlet port 1, and closes the indoor-air inlet port 2. Thereby, outdoor air is drawn into the intake through the outdoor-air inlet port 1, and the subsidiary indoor-air inlet port 7 is partially opened, so that some indoor air flows into the intake. The subsidiary door 6 opens the subsidiary indoor-air inlet port 7 using the difference in pressure occurring when a blower fan 12 is operated and the weight of the subsidiary door 6. Thus, in the outdoor-air mode, some indoor air is also fed through the subsidiary indoor-air inlet port 7, in addition to outdoor air.

Therefore, the above-mentioned intake is advantageous in that, when the air-conditioner is set to the outdoor-air mode and a heater is operated to heat the interior of a vehicle, in the case where the outdoor temperature is much lower than the indoor temperature, as in winter, outdoor air is fed through the outdoor-air inlet port 1, and some of the indoor air is fed through the subsidiary indoor-air inlet port 7, so that the outdoor air is mixed with the indoor air, and heating efficiency is thus increased. However, such an intake is problematic in that the main door 4b has the shape of a flat plate, so that it cannot be applied to the intake shown in FIGS. 1 and 2. Further, since the subsidiary door 6 is rotatably connected to the main door 4b and is opened or closed using its own weight or a difference in pressure, the subsidiary door may malfunction because of abrasion or corrosion at the junction of the subsidiary door 6 and the main door. Furthermore, since the opening of the subsidiary door 6 is not controlled at a constant ratio, the quantity of indoor air drawn through the subsidiary indoor-air inlet port 7 is irregular. Thus, it is impossible to precisely control the quantity of indoor air that is drawn into the intake.

DISCLOSURE OF INVENTION

Technical Problem

Accordingly, the present invention has been made keeping in mind the above problems occurring in the prior art, and an object of the present invention is to provide a method for controlling an intake of an air-conditioner of a vehicle, which is capable of automatically controlling the intake of the air-conditioner so that it is appropriate for an environment required by a user, during the inflow of outdoor air, and which is capable of heating the vehicle to keep the interior of the vehicle pleasant, and which enhances heating efficiency.

Technical Solution

In order to accomplish the above object, the present invention provides a method for controlling an intake of an air-conditioner of a vehicle, the air-conditioner including an air-conditioner casing 100 having an evaporator 110 and a heater core therein, with a defrost vent 101, a face vent 102, and a floor vent 103 formed in an outlet side of the air-conditioner casing; a blower 130 provided on an inlet side of the air-conditioner casing 100; and an intake 200 including a housing 210 which is installed to cover the blower 130 and has an outdoor-air inlet port 211, an indoor-air inlet port 212, and a subsidiary indoor-air inlet port 213 at predetermined positions in the housing, a main door 220 which rotates about a main-door drive shaft 221 while tracing an arc, thus opening or closing the outdoor-air inlet port 211 or the indoor-air inlet port 212, a subsidiary door 230 which rotates about a subsidiary-door drive shaft 231 to open or close the subsidiary indoor-air inlet port 213, and a drive means for driving the main door 220 and the subsidiary door 230, the method including the a-1) step S1 at which the main door 220 of the intake 200 opens the outdoor-air inlet port 211 and closes the indoor-air inlet port 212, so that only outdoor air flows into the intake; the b-1) step S2 of detecting operation of the blower 130; the c-1) step S3 of determining whether set indoor temperature of the vehicle is predetermined temperature or higher; and the d-1) step S4 at which the subsidiary door 230 opens the subsidiary indoor-air inlet port 213 so that some indoor air flows into the intake.

The predetermined temperature of the step C-1) is a maximum heating temperature set by a temperature setting part 310 or a temperature in a range which is close to the maximum heating temperature.

The method further includes the e-1) step implemented between the step C-1) and the step d-1), and detecting that a specific mode is selected, among a plurality of modes which are set to open at least one of the vents 101, 102, and 103 so that a temperature and a quantity of air discharged from each of the vents 101, 102, and 103 are controlled and an interior of the vehicle is thus air-conditioned.

The method further includes the f-1) step S6 of detecting that voltage applied to the blower 130 is a predetermined voltage or higher, after the step e-1).

The specific mode is selected from any one of a floor mode, a mix mode, and a defrost mode.

The predetermined voltage is 6V.

In order to accomplish the above object, the present invention provides another method for controlling an intake of an air-conditioner of a vehicle, the air-conditioner including an air-conditioner casing 100 having an evaporator 110 and a heater core therein, with a defrost vent 101, a face vent 102, and a floor vent 103 formed in an outlet side of the air-conditioner casing; a blower 130 provided on an inlet side of the air-conditioner casing 100; and an intake 200 including a housing 210 which is installed to cover the blower 130 and has an outdoor-air inlet port 211, an indoor-air inlet port 212, and a subsidiary indoor-air inlet port 213 at predetermined positions in the housing, a main door 220 which rotates about a main-door drive shaft 221 while tracing an arc, thus opening or closing the outdoor-air inlet port 211 or the indoor-air inlet port 212, a subsidiary door 230 which rotates about a subsidiary-door drive shaft 231 to open or close the subsidiary indoor-air inlet port 213, and a drive means for driving the main door 220 and the subsidiary door 230, the method including the a-2) step S1, at which the main door 220 of the intake 200 opens the outdoor-air inlet port 211 and closes the indoor-air inlet port 212, so that only outdoor air flows into the intake; the b-2) step S2 of detecting operation of the blower 130; the c-2) step S5 of detecting that a specific mode is selected, among a plurality of modes which are set to open at least one of the vents 101, 102, and 103 so that a temperature and a quantity of air discharged from each of the vents 101, 102, and 103 are controlled and an interior of the vehicle is thus air-conditioned; and the d-2) step S4, at which the subsidiary door 230 opens the subsidiary indoor-air inlet port 213 so that some indoor air flows into the intake.

Advantageous Effects

According to the present invention, a method for controlling an intake of an air-conditioner of a vehicle automatically controls the intake of the air-conditioner so that it is appropriate for an environment required by a user, thus allowing some indoor air to flow into the intake while outdoor air is flowing into the intake, therefore keeping the indoor temperature of the vehicle pleasant, and enhancing heating efficiency.

BRIEF DESCRIPTION OF THE DRAWINGS

FIG. 1 is a perspective view showing a conventional intake of an air-conditioner of a vehicle;

FIG. 2 is a schematic view illustrating the operation of the intake shown in FIG. 1;

FIG. 3 is a sectional view showing another conventional intake of an air-conditioner of a vehicle;

FIGS. 4 to 6 are flowcharts illustrating methods for controlling an intake of an air-conditioner of a vehicle, according to the present invention;

FIG. 7 is a view showing an automatic-type control unit;

FIG. 8 is a view showing a manual-type control unit;

FIG. 9 is a partially cut away view showing the air-conditioner;

FIGS. 10 to 12 are partial sectional views illustrating the operation of an intake shown in FIG. 9;

FIG. 13 is an exploded perspective view showing an embodiment of the intake of the air-conditioner;

FIGS. 14 to 16 are schematic views illustrating the operation of the air-conditioner of the vehicle, according to the present invention; and FIG. 17 is a flowchart illustrating another method for controlling an intake of an air-conditioner of a vehicle, according to the present invention.

DESCRIPTION OF REFERENCE CHARACTERS OF IMPORTANT PARTS

100: air-conditioner casing
101: defrost vent
101d: defrost door
102: face vent
102d: face door
103: floor vent
103d: floor door
110: evaporator
120: heater core
130: blower
200: intake
210: housing
211: outdoor-air inlet port
212: indoor-air inlet port
213: subsidiary indoor-air inlet port 220: main door
221: main-door drive shaft
230: subsidiary door
231: subsidiary-door drive shaft
240: link unit
241: main-door lever
242: subsidiary-door lever
243: connection link
244: plane cam
300: control unit
310: temperature setting part
311: temperature switch
320: mode setting part
330: airflow setting part
S1~S6: respective steps of method for controlling intake of air-conditioner of vehicle, according to the present invention

MODE FOR THE INVENTION

FIGS. 4 to 6 are flowcharts illustrating methods for controlling an intake of an air-conditioner of a vehicle, according to the present invention, FIG. 7 is a view showing an automatic-type control unit, and FIG. 8 is a view showing a manual-type control unit.

A method for controlling an intake of an air-conditioner of a vehicle according to the present invention controls an intake 200 of the air-conditioner, including an air-conditioner casing 100, a blower 130, and the intake 200, through steps that will be described below. The air-conditioner casing 100 has an evaporator 110 and a heater core 120 therein. A defrost vent 101, a face vent 102, and a floor vent 103 are formed in the outlet side of the air-conditioner casing 100. The blower 130 is provided on the inlet side of the air-conditioner casing 100. The intake 200 includes a housing 210, a main door 220, a subsidiary door 230, and a drive means. The housing 210 is installed to cover the blower 130. An outdoor-air inlet port 211, an indoor-air inlet port 212, and a subsidiary indoor-air inlet port 213 are provided at predetermined positions on the housing. The main door 220 rotates about a main-door drive shaft 221 while tracing an arc, thus opening or closing the outdoor-air inlet port 211 or the indoor-air inlet port 212. The subsidiary door 230 rotates about a subsidiary-door drive shaft 231 to open or close the subsidiary indoor-air inlet port 213. The drive means functions to drive the main door 220 and the subsidiary door 230.

As shown in FIG. 4, the method for controlling the intake according to the present invention includes the a-1) step S1 of detecting that only outdoor air flows into the air-conditioner casing 100, the b-1) step S2 of detecting the operation of the blower 130, the c-1) step S3 of detecting that the set indoor temperature of the vehicle is a predetermined temperature or higher, and the d-1) step S4 at which the subsidiary door 230 opens the subsidiary indoor-air inlet port 213 so that some indoor air flows into the intake.

At the first step, that is, the a-1) step S1, the position of the main door 220 is checked to detect the inflow of only outdoor air. That is, when the main door 200 closes the indoor-air inlet port 212 and opens only the outdoor-air inlet port 211, it is determined that only outdoor air flows into the air-conditioner casing 100, at step S1.

Further, the inflow of outdoor air may be detected through a different method, at step S1. Specifically, when the drive means of the intake 200 is operated in a feedback voltage method using an actuator, the voltage required when the main door 220 opens the outdoor-air inlet port 211 and closes the indoor-air inlet port 212 so that outdoor air flows into the air-conditioner casing, and the voltage required when the main door 220 closes the outdoor-air inlet port 211 and opens the indoor-air inlet port so that indoor air flows into the air-conditioner casing are preset. Thus, by checking the voltage applied to the actuator, it may be determined that only outdoor-air flows into the air-conditioner casing, at step S1. In the case in which this method is used, the actuator is used as the drive means of the intake 200. The present invention is not limited to this method.

At the second step, that is, the b-1) step S2, the operation of the blower 130 is detected. At the third step, that is, the c-1) step S3, it is determined whether the set indoor temperature of the vehicle is a predetermined temperature or higher.

At the b-1) step S2, the operation of the blower 130 may be detected by checking the voltage that is applied to the blower 130 in order to operate the blower 130.

At the c-1) step S3, whether the set indoor temperature is a predetermined temperature or higher is determined through various methods. The predetermined temperature may be set in consideration of the environment in which the vehicle is driven.

First, the c-1) step S3 of determining whether the set temperature is a predetermined temperature or higher may use a method of directly measuring the indoor temperature of the vehicle.

Second, the c-1) step S3 of determining whether the set temperature is a predetermined temperature or higher may use a method of checking that the set indoor temperature is a predetermined temperature or higher using a temperature setting part 310, which is manipulated by a user to set the temperature in the vehicle.

Meanwhile, a control unit 300, which is manipulated to provide an air-conditioned environment required by a user, is shown in FIGS. 7 and 8. Indoor-air/outdoor-air selection, mode selection, airflow control, and temperature control are performed by the control unit 300.

As shown in FIG. 7, the automatic-type control unit 300 displays the temperature inside the vehicle, and in addition, displays a temperature to be achieved by manipulating a temperature switch 311 of the temperature setting part 310. Further, a mode setting part 320, which is used to select a mode from among a vent mode, a bi-level mode, a floor mode, a mix mode, and a defrost mode, and an airflow setting part 330, which is used to control the quantity of air blowing into the vehicle, are provided in the control unit 300.

In the automatic-type control unit of FIG. 7, the indoor temperature of the vehicle is sensed, and a passenger raises or lowers the displayed temperature by manipulating the temperature switch 311, so that the set indoor temperature of the vehicle is controlled. Thus, after the temperature which is set by the temperature setting part 310 is checked, it may be determined whether the set temperature is a predetermined temperature or higher.

In the automatic-type control unit, when the set temperature is about 32° C. or higher, a symbol "HI" meaning "high" is displayed on a set-temperature display portion, instead of specific temperature. This signifies a maximum heating mode. Thus, the temperature (including the symbol "HI"), set by manipulating the temperature switch 311, is checked, and whether the set temperature is a predetermined temperature or higher is determined at step S3.

Meanwhile, FIG. 8 is a view showing a manual-type control unit 300. By rotating switches which are provided on respective central portions of a temperature setting part 310, a mode setting part 320, and an airflow setting part 330 of the manual-type control unit 300, temperature, a mode, and airflow are controlled.

In the case of the manual-type control unit, the temperature setting part 310 may control temperature by rotating a temperature switch 311, which is provided on the central portion of the temperature setting part 310. When the temperature switch 311 is rotated leftmost, this is a maximum cooling mode. Conversely, when the temperature switch 311 is rotated rightmost, this is a maximum heating mode. This corresponds to the state when the symbol "HI" is displayed in the automatic-type control unit 300.

Thus, in the case where the control unit 300 is the manual-type control unit, as shown in FIG. 8, the predetermined temperature is included within a range of about 7/8~8/8 of the temperature of the maximum cooling state and the maximum heating state when the temperature of the maximum state is divided by 8. That is, the predetermined temperature may be included within the range corresponding to the maximum heating state. A passenger checks that the temperature set by rotating the temperature switch 311 is included within the above-mentioned range, and whether the set temperature is the predetermined temperature or higher is determined.

In a detailed description, this method is based on whether the temperature setting part 310 is set to the range of a maximum heating state or a neighboring range. That is, it is determined whether the temperature set by rotating the switch of the temperature setting part 310 is higher than the temperature of the maximum heating state, obtained when the switch is rotated rightmost, or the temperature of a neighboring range, and it is checked whether the switch of the temperature setting part 310 is located in the range corresponding the maximum heating state or the neighboring range.

Further, according to the third method, as the temperature set by the temperature setting part 310 changes, the position of a temp door in the air-conditioner changes. Thus, by checking the position of the temp door, it may be determined whether the set temperature is a predetermined temperature or higher at step S4.

At the fourth step, that is, the d-1) step S4, the subsidiary door 230 opens the subsidiary indoor-air inlet port 213 so that some of the indoor air flows into the intake. When all of the above three steps have been conducted, the subsidiary door 230 opens the subsidiary indoor-air inlet port 213, which is formed at a predetermined position in the intake 200, so that some indoor air flows into the air-conditioner of the vehicle.

However, if it is determined that outdoor air is not fed into the intake at the first step, or the blower 130 stops operating at the second step, or the set temperature is lower than a predetermined temperature at the third step, the subsidiary door 230 closes the subsidiary indoor-air inlet port 213 so that only outdoor air flows into the intake.

Meanwhile, when the blower 130 is operating and the set indoor temperature of the vehicle is a predetermined temperature or higher, during the inflow of outdoor air, some indoor air flows through the subsidiary door 230 of the intake 200, thus providing a more pleasant environment to a user and enhancing heating efficiency.

The method for controlling the intake of the air-conditioner of the vehicle according to the present invention may further include the e-1) step S5 of detecting that a specific mode has been selected, between the c-1) step S3 of detecting that the set indoor temperature of the vehicle is predetermined temperature or higher, and the d-1) step S4 of introducing some indoor air into the intake. The flowchart is shown in FIG. 5.

The d-1) set-mode determining step S5 determines a mode which is set by a user using the mode setting part 320 for setting a mode.

Generally, the vehicle includes a vent mode, a bi-level mode, a floor mode, a mix mode, and a defrost mode. The vent mode is the mode in which air is discharged through the face vent 102 so that air is discharged to the upper portion in the vehicle. The bi-level mode is the mode in which air having different conditions is discharged to the upper and lower portions of the vehicle, respectively. The floor mode is the mode in which air is discharged through the floor vent 103 (i.e. floor portion).

Further, the mix mode is the mode in which mixed air is discharged to the interior of the vehicle. The defrost mode is the mode in which air is discharged through the defrost vent 101 to a windshield, thus removing frost from the windshield.

At step S5 of detecting the selection of the specific mode, it is preferable that the specific mode be the floor mode, the mix mode, or the defrost mode, among a cooling/heating mode and modes for controlling the volume of air to be discharged to the respective vents 101, 102, and 103.

Further, the method for controlling the intake of the air-conditioner of the vehicle according to the present invention may include the e-1) step S6 of detecting that the voltage of the blower 130 is a predetermined voltage or higher, after the step S5 of detecting the selection of the specific mode.

At the step S6 of detecting that the voltage of the blower 130 is a predetermined voltage or higher, when the voltage of the blower 130 is low, so that the volume of air discharged to the air-conditioner casing 100 is small, pressure is generated in a filter which is provided above the blower 130. Thus, the quantity of air introduced from the exterior is larger than the quantity of air fed to the heater, so that a difference in pressure occurs. At this time, if the subsidiary indoor-air inlet port 213 of the intake 200 is opened, some of the air introduced from the exterior may flow backwards through the subsidiary indoor-air door due to the difference in pressure. In order to solve this problem, when the voltage of the blower 130 which is sufficient to prevent some of outdoor air from flowing backwards is sensed, the subsidiary indoor-air inlet port 213 is opened.

Generally, the airflow setting part 330 is rotated to set the stage desired by a user, in the same manner as the mode setting part 320. Since the voltage which is set according to the stage is applied to the blower 130, it can be determined which stage is the airflow setting part 330. It is preferable that the predetermined voltage be 6V.

FIG. 9 is a partially cut away view showing the air-conditioner, FIGS. 10 to 12 are partial sectional views illustrating the operation of the intake shown in FIG. 9, and FIG. 13 is an exploded perspective view showing an embodiment of the intake of the air-conditioner. Since the intake 200 of the air-conditioner of the vehicle shown in FIGS. 9 to 13 is disclosed only for illustrative purposes in order to describe the control method of the present invention, the present invention is not limited to this intake.

As shown in the drawings, the intake 200 of the air-conditioner of the vehicle according to an embodiment of the present invention includes a housing 210, a main door 220, a subsidiary door 230, and a drive means. The housing 210 is provided to cover a blower 130, with an outdoor-air inlet port 211, an indoor-air inlet port 212, and a subsidiary indoor-air inlet port 213 formed at predetermined positions on the housing 210. The main door 220 rotates about a main-door drive shaft 221 while tracing an arc, thus opening or closing the outdoor-air inlet port 211 or the indoor-air inlet port 212. The subsidiary door 230 rotates about a subsidiary-door drive shaft 231, thus opening or closing the subsidiary indoor-air inlet port 213. The drive means functions to drive the main door 220 and the subsidiary door 230.

The main door 220 may be provided with an additional actuator (not shown) serving as a drive means. As the main-door drive shaft 221 rotates, the main door 200 rotates while tracing an arc, thus opening or closing the outdoor-air inlet port 211 or the indoor-air inlet port 212.

FIG. 10 shows the state in which the main door 220 opens the outdoor-air inlet port 211 and closes the indoor-air inlet port 212, and a subsidiary indoor-air inflow condition is not satisfied, so that the subsidiary door 230 is closed, and thereby only outdoor air flows into the intake. FIG. 11 shows the state in which the main door 220 opens the indoor-air inlet port 212 and the subsidiary door 230 is closed, so that only indoor air flows through the indoor-air inlet port 212. FIG. 12 shows the state in which respective set steps are satisfied in the outdoor-air mode, so that the subsidiary door 230 is opened, and thus some of the indoor air flows through the subsidiary indoor-air inlet port 213, together with outdoor air.

When the above-mentioned steps are satisfied in the outdoor-air mode, as shown in FIG. 12, the intake 200 of the air-conditioner of the vehicle is operated, so that the subsidiary door 230 opens the subsidiary indoor-air inlet port 213, and thus some indoor air flows into the intake. An embodiment of the intake is shown in FIG. 13.

As shown in FIG. 13, the intake 200 of the air-conditioner of the vehicle includes an outdoor-air inlet port, an indoor-air inlet port 212, a main door 220, a main-door drive shaft 221, and a housing 210. Further, a subsidiary indoor-air inlet port 213 is formed in one side of the housing 210. A subsidiary door 230 rotates to open or close the subsidiary indoor-air inlet port 213. A subsidiary-door drive shaft 231 serves as a rotating central axis of the subsidiary door 230. In this case, the main-door drive shaft 221 and the subsidiary-door drive shaft 231 are mechanically connected to each other by a link unit 240, which includes a main door lever, a subsidiary door lever, a connection link, and a plane cam. Thus, in order to open the subsidiary indoor-air inlet port 213 in the state in which the outdoor-air inlet port 211 is opened and the indoor-air inlet port 212 is closed, the main door 220 and the subsidiary door 230 are rotated in conjunction with each other via the link unit 240.

The link unit 240 of FIG. 13 includes the main door lever 241, the subsidiary door lever 242, the connection link 243, and the plane cam 244. However, link units of various shapes may be used, in addition to the link unit of FIG. 13. As long as the subsidiary door 230 is opened so that some of the indoor air flows into the intake when the inflow of the indoor air is required in the outdoor-air mode (step S4 of opening the subsidiary door 230 is satisfied), a link unit having any shape is acceptable.

FIGS. 14 to 16 are schematic views illustrating the operation of the air-conditioner of the vehicle, according to the present invention. This operation will be described with reference to the method for controlling the air-conditioner of the vehicle of FIG. 4.

As shown in the drawings, the method for controlling the intake of the air-conditioner of the vehicle according to the present invention is applied to the air-conditioner including the air-conditioner casing 100, the blower 130, and the intake 200. The evaporator 110 and the heater core 120 are provided in the air-conditioner casing 100. The defrost vent 101, the face vent 102, and the floor vent 103 are formed in the outlet side of the air-conditioner casing 100. The blower 130 is provided on the inlet side of the air-conditioner casing 100. The intake 200 is installed to cover the blower 130.

The opening and closure of the defrost vent 101, the face vent 102, and the floor vent 103 are controlled by respective doors 101d, 102d, and 103d which are mounted to the corresponding vents, in response to the mode set by a user.

FIG. 14 shows the state in which, even though the main door 220 opens the outdoor-air inlet port 211 and closes the indoor-air inlet port 212, so that only outdoor air flows into the intake at step S1, the operation of the blower 130 is not detected at step S2. Further, FIG. 14 shows the state in which, even though outdoor air flows into the intake at step S1 and the operation of the blower 130 is detected at step S2, it is determined that set temperature in the vehicle is predetermined temperature or less (the c-1) step S3 is not satisfied), so that the subsidiary door 230 is not opened, and only outdoor air flows into the intake.

FIG. 15 shows the state in which the main door 220 closes the outdoor-air inlet port 211 and opens the indoor-air inlet port 212, so that only indoor air flows into the intake. Since the first step, required to open the subsidiary door 230 so that some indoor air flows into the intake at step S4, that is, step S1 of detecting the inflow of only outdoor air, is not satisfied, as shown in the drawing, the subsidiary door 230 closes the subsidiary indoor-air inlet port 213.

Referring to FIG. 16, the main door 220 completely opens the outdoor-air inlet port 211 and closes the indoor-air inlet port 212, so that the inflow of only outdoor air is detected at step S1. The operation of the blower 130 is detected at step S2. It is detected that the set temperature in the vehicle is a predetermined temperature or higher at step S3. Thereby, the subsidiary door 230 opens the subsidiary indoor-air inlet port 213, and some indoor air as well as outdoor air flows into the intake, at step S4.

As described above, the method for controlling the intake of the air-conditioner of the vehicle according to the present invention makes some subsidiary indoor air flow into the intake when the inflow condition of the subsidiary indoor air is satisfied and outdoor air flows into the intake, thus enhancing heating performance, and in addition, enhancing the efficiency of a cooling operation. In other words, when it is determined that cooling performance achieved merely through the outdoor-air mode is insufficient during cooling operation, the method for controlling the intake of the air-conditioner of the vehicle according to the present invention opens the subsidiary door 230 and draws indoor air as appropriate, thus enabling rapid cooling operation.

Meanwhile, another method for controlling an intake of an air-conditioner of a vehicle according to the present invention controls an intake 200 of the air-conditioner, including an air-conditioner casing 100, a blower 130, and the intake 200, through steps that will be described below. The air-conditioner casing 100 has an evaporator 110 and a heater core therein, with a defrost vent 101, a face vent 102, and a floor vent 103 formed in an outlet side of the air-conditioner casing. The blower 130 is provided on an inlet side of the air-conditioner casing 100. The intake 200 includes a housing 210, a main door 220, a subsidiary door 230, and a drive means. The housing is installed to cover the blower 130, and has an outdoor-air inlet port 211, an indoor-air inlet port 212, and a subsidiary indoor-air inlet port 213 at predetermined positions in the housing. The main door 220 rotates about a main-door drive shaft 221 while tracing an arc, thus opening or closing the outdoor-air inlet port 211 or the indoor-air inlet port 212. The subsidiary door 230 rotates about a subsidiary-door drive shaft 231 to open or close the subsidiary indoor-air inlet port 213. The drive means functions to drive the main door 220 and the subsidiary door 230. The control method includes the a-2) step S1, at which the main door 220 of the intake 200 opens the outdoor-air inlet port 211 and closes the indoor-air inlet port 212, so that only outdoor air flows into the intake, the b-2) step S2 of detecting operation of the blower 130, the c-2) step S5 of detecting that a specific mode is selected, among a plurality of modes which are set to open at least one of the vents 101, 102, and 103 so that a temperature and a quantity of air discharged from each of the vents 101, 102, and 103 are controlled and an interior of the vehicle is thus air-conditioned, and the d-2) step S4, at which the subsidiary door 230 opens the subsidiary indoor-air inlet port 213 so that some indoor air flows into the intake.

The a-2) step S1 of detecting that only outdoor air flows into the intake, the b-2) step S2 of detecting the operation of the blower 130, the c-2) step S5 of detecting the selection of a specific mode, and the d-2) step S4 of opening the subsidiary indoor-air inlet port 213 so that some of indoor air flows into the intake are the same as those of the first embodiment. However, in place of the step S3 of detecting that the indoor temperature of the vehicle is a predetermined temperature or higher in the first embodiment, the c-2) step S5 of detecting the selection of a specific mode is used in the second embodiment.

The steps common to the first embodiment and the second embodiment carry the same reference numerals S1 to S6. As described above, the first embodiment uses a-1, b-1, c-1, d-1, e-1, and f-1. In order to distinguish the second embodiment from the first embodiment, the second embodiment uses a-2, b-2, c-2, and d-2.

At the c-2) step S5 of detecting that a specific mode is selected, it is preferable that the specific mode be any one of the floor mode, the mix mode, or the defrost mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for controlling an intake of an air-conditioner of a vehicle, the air-conditioner comprising:
    an air-conditioner casing (100) having an evaporator (110) and a heater core therein, with a defrost vent (101), a face vent (102), and a floor vent (103) formed in an outlet side of the air-conditioner casing;
    a blower (130) provided on an inlet side of the air-conditioner casing (100); and
    an intake (200) comprising a housing (210) which is installed to cover the blower (130) and has an outdoor-air inlet port (211), an indoor-air inlet port (212), and a subsidiary indoor-air inlet port (213) at predetermined positions in the housing, a main door (220) which rotates about a main-door drive shaft (221) while tracing an arc, thus opening or closing the outdoor-air inlet port (211) or the indoor-air inlet port (212), a subsidiary door (230) which rotates about a subsidiary-door drive shaft (231) to open or close the subsidiary indoor-air inlet port (213), and drive means for driving the main door (220) and the subsidiary door (230), the method comprising:
    a-1) step (S1) at which the main door (220) of the intake (200) opens the outdoor-air inlet port (211) and closes the indoor-air inlet port (212), so that only outdoor air flows into the intake;
    b-1) step (S2) of detecting operation of the blower (130);
    c-1) step (S3) of determining whether set indoor temperature of the vehicle is predetermined temperature or higher; and
    d-1) step (S4) at which the subsidiary door (230) opens the subsidiary indoor-air inlet port (213) so that some indoor air flows into the intake.

2. The method according to claim 1, wherein the predetermined temperature of the step C-1) is a maximum heating temperature set by a temperature setting part (310) or a temperature in a range which is close to the maximum heating temperature.

3. The method according to claim 1, further comprising:
    e-1) step implemented between the step C-1) and the step d-1), and detecting that a specific mode is selected, among a plurality of modes which are set to open at least one of the vents (101, 102, 103) so that a temperature and a quantity of air discharged from each of the vents (101, 102, 103) are controlled and an interior of the vehicle is thus air-conditioned.

4. The method according to claim 3, further comprising:
    f-1) step (S6) of detecting that voltage applied to the blower (130) is a predetermined voltage or higher, after the step e-1).

5. The method according to claim 3 or 4, wherein the specific mode is selected from any one of a floor mode, a mix mode, and a defrost mode.

6. The method according to claim 4, wherein the predetermined voltage is 6V.

7. A method for controlling an intake of an air-conditioner of a vehicle, the air-conditioner comprising:
    an air-conditioner casing (100) having an evaporator (110) and a heater core therein, with a defrost vent (101), a face vent (102), and a floor vent (103) formed in an outlet side of the air-conditioner casing;
    a blower (130) provided on an inlet side of the air-conditioner casing (100); and
    an intake (200) comprising a housing (210) which is installed to cover the blower (130) and has an outdoor-air inlet port (211), an indoor-air inlet port (212), and a subsidiary indoor-air inlet port (213) at predetermined positions in the housing, a main door (220) which rotates about a main-door drive shaft (221) while tracing an arc, thus opening or closing the outdoor-air inlet port (211) or the indoor-air inlet port (212), a subsidiary door (230) which rotates about a subsidiary-door drive shaft (231) to open or close the subsidiary indoor-air inlet port (213), and drive means for driving the main door (220) and the subsidiary door (230), the method comprising:
    a-2) step (S1), at which the main door (220) of the intake (200) opens the outdoor-air inlet port (211) and closes the indoor-air inlet port (212), so that only outdoor air flows into the intake;
    b-2) step (S2) of detecting operation of the blower (130);
    c-2) step (S5) of detecting that a specific mode is selected, among a plurality of modes which are set to open at least one of the vents (101, 102, 103) so that a temperature and a quantity of air discharged from each of the vents (101, 102, 103) are controlled and an interior of the vehicle is thus air-conditioned; and
    d-2) step (S4), at which the subsidiary door (230) opens the subsidiary indoor-air inlet port (213) so that some indoor air flows into the intake.

* * * * *